United States Patent [19]

Van Bork

[11] Patent Number: 5,056,036
[45] Date of Patent: Oct. 8, 1991

[54] COMPUTER CONTROLLED METERING PUMP

[75] Inventor: Erik C. Van Bork, Honeoye Falls, N.Y.

[73] Assignee: Pulsafeeder, Inc., Rochester, N.Y.

[21] Appl. No.: 424,443

[22] Filed: Oct. 20, 1989

[51] Int. Cl.⁵ .............................. G06F 15/20
[52] U.S. Cl. ...................... 364/510; 417/14
[58] Field of Search .......... 364/510, 509, 561, 565, 364/479; 604/65; 73/3; 417/12, 14, 15, 388; 222/1, 14

[56] References Cited

U.S. PATENT DOCUMENTS

| | | | |
|---|---|---|---|
| 3,756,456 | 9/1973 | Georgi | 73/3 |
| 3,913,314 | 10/1975 | Yannone et al. | 417/388 |
| 4,241,602 | 12/1980 | Han et al. | 417/388 |
| 4,288,230 | 9/1981 | Ebeling et al. | 417/388 |
| 4,315,523 | 2/1982 | Mahawili et al. | 417/388 |
| 4,449,476 | 5/1984 | Voswinckel et al. | 417/388 |
| 4,474,309 | 10/1984 | Solomon | 417/388 |
| 4,547,680 | 10/1985 | Edler | 417/388 |
| 4,715,786 | 12/1987 | Wolff et al. | 364/510 |
| 4,723,976 | 2/1988 | Shanaberger | 417/388 |
| 4,796,782 | 1/1989 | Wales et al. | 417/388 |
| 4,828,464 | 5/1989 | Maier et al. | 417/388 |
| 4,897,797 | 1/1990 | Free, Jr. et al. | 364/502 |

OTHER PUBLICATIONS

Metering Pump Handbook by McCabe et al., Industrial Press, New York.
Pulsa Series Hydracone R1 Brochure, Catalog 140, 1988.
Milton Roy Company Product Data PD 35.20 HPD High Performance Diaphragm Metering Pump.

Primary Examiner—Parshotam S. Lall
Assistant Examiner—Ellis B. Ramirez
Attorney, Agent, or Firm—Pollock, Vande Sande & Priddy

[57] ABSTRACT

A computer controlled metering pump. The displacement of a metering pump is accurately monitored using a position sensor connected to a piston. A control computer receives the sensor signal as well as a desired pumping volume rate. The pumped volume is continuously monitored by the computer as a function of the piston displacement, and compared with the desired rate. The metering pump is controlled to bring the pumped volume rate into agreement with the desired volumetric pumping rate.

16 Claims, 7 Drawing Sheets

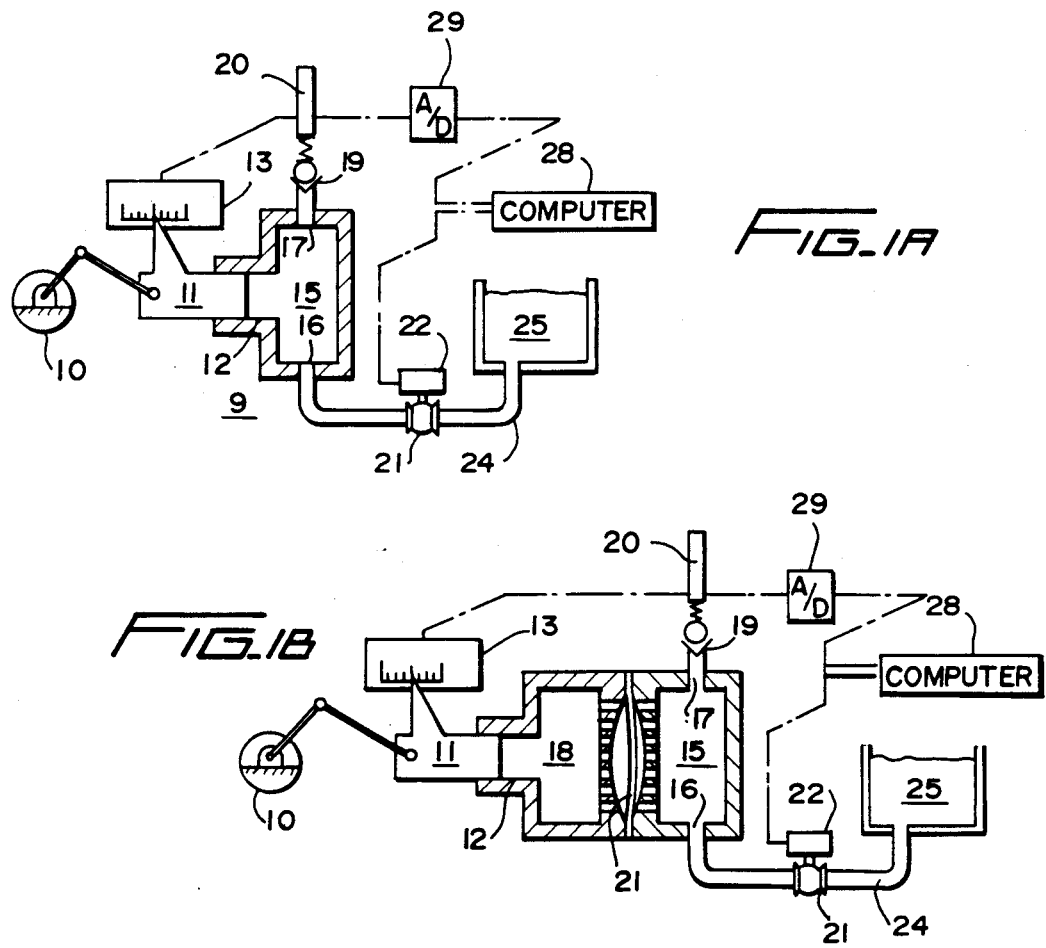
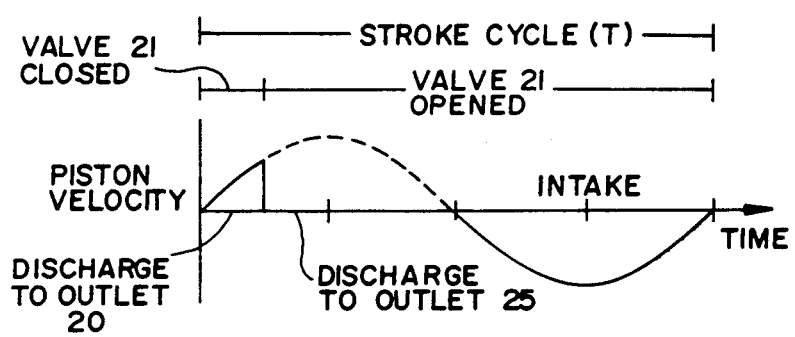

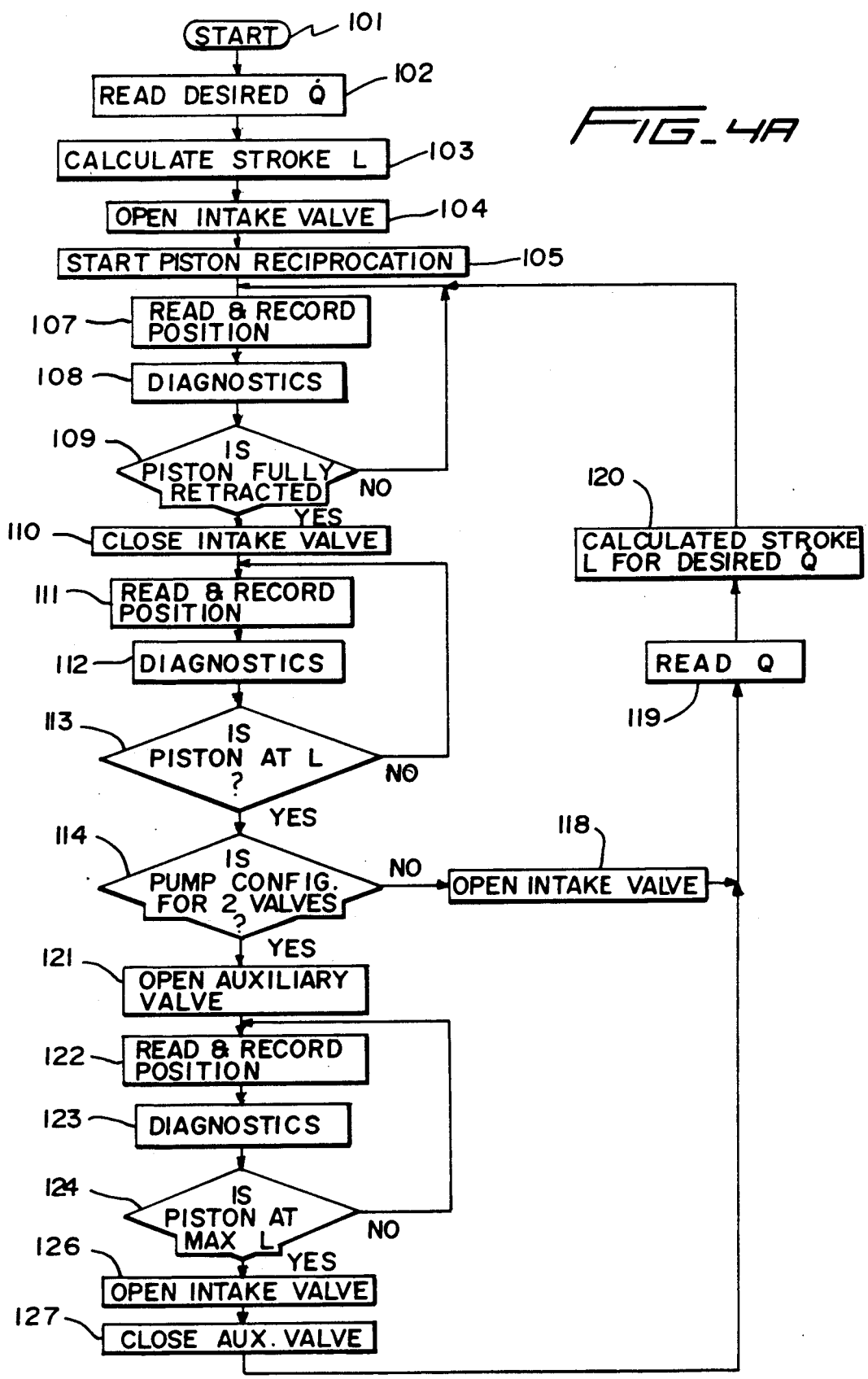
FIG_4A

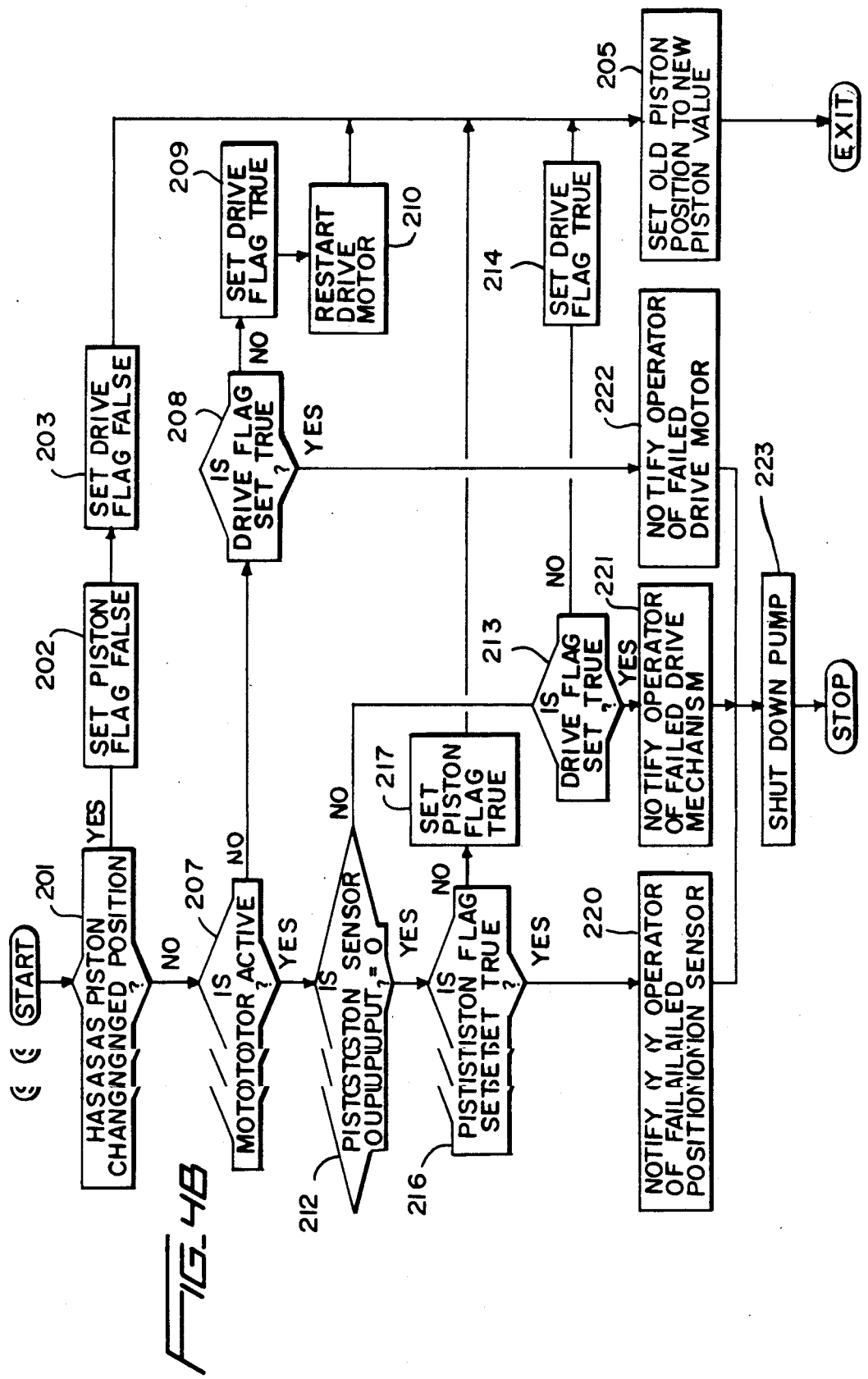

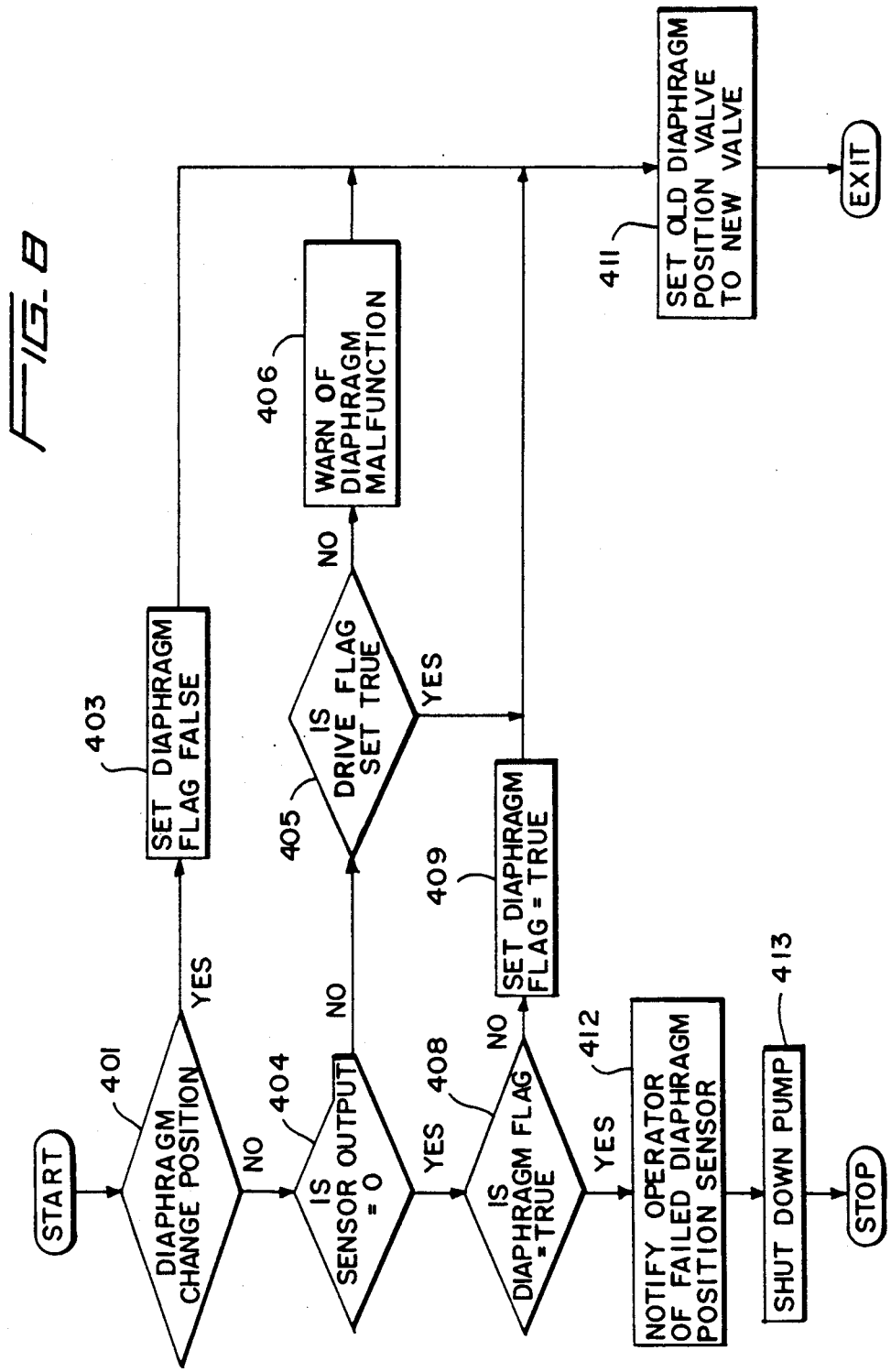

COMPUTER CONTROLLED METERING PUMP

BACKGROUND OF THE INVENTION

The present application relates to metering pumps. Specifically, a computerized control system is described for accurately monitoring and controlling the amount of pumped media in a chemical process application.

Metering pumps are used in a variety of chemical processes to control the quantities of chemicals which are used in the process. For instance, in chemical processing plants, and water treatment plants, it is necessary to accurately add precise quantities of difficult-to-handle fluids with other constituent products during the chemical process. Metering pumps manufactured by the assignee of the present application, Pulsafeeder, Inc., are capable of providing precise quantities of pumped media within 1% of a nominal media volume.

Large chemical process plants typically are computer-controlled from a central processor. The amounts and rate of individual constituent chemicals used in a process are controlled by metering pumps which may be distributed at various points within a chemical process plant. The flow rate produced by these pumps must be monitored and precisely regulated if the overall chemical process is to be accurately controlled.

The present application is directed to providing for the distributed control over these various metering pumps such that the central control processor for the chemical plant may be operated in confidence that each of the metering pumps throughout the plant are being accurately controlled by a localized control system.

SUMMARY OF THE INVENTION

It is a primary object of this invention to provide for a localized control system for a metering pump.

It is a specific object of this invention to provide computerized control over a metering pump to accurately control the quantity of fluid pumped in a chemical process system.

These and other objects of the invention are provided by a computer control system. The computer control system will accurately monitor the displacement in a metering pump, and based on the displacement, determine whether or not the desired quantity of fluid has been dispensed within a given stroke of the metering pump. When the pumped quantity of fluid as determined by the pumping stroke displacement is determined not to be in accordance with the desired quantity of fluid displaced during a pump cycle, control is effected over the metering pump to reduce or increase the amount of pumped fluid in a given stroke cycle.

In carrying out the invention in accordance with a first embodiment, a position sensor accurately monitors the position of a piston during a pumping cycle. The monitored position is used to calculate a volumetric displacement for the pump.

When the calculated volumetric displacement for the pump exceeds or is less than the desired amount, control over the pump may be effected in a variety of ways. In a first embodiment, control is effected over the amount of pumped media discharged by the pump during the exhaust portion of the pump stroke.

In a further embodiment of the invention, the metering pump is a diaphragm metering pump in which the amount of pumped media is controlled by controlling the fluid media within the pressurizing chamber. During a pumping stroke, when the diaphragm has been displaced a distance which produces the precise quantity of fluid into the pump, the pressurizing chamber is vented, inhibiting any further pumping of media.

In yet another embodiment of the invention, accurate diaphragm positioning is provided by a set of diaphragm position sensors which measures the displacement of the diaphragm. It is thus possible to accurately position the diaphragm prior to an exhaust cycle of the metering pump to thereby discharge the precise volume of pumped media.

BRIEF DESCRIPTION OF THE FIGURES

FIG. 1A illustrates a schematic drawing of a computerized metering pump in accordance with a first embodiment of the invention.

FIG. 1B illustrates a second embodiment of the invention wherein a diaphragm metering pump is computer controlled.

FIG. 2 illustrates the operation of the computerized metering pumps of FIGS. 1A and 1B.

FIG. 4A illustrates the programming carried out by the computer of the embodiments of FIGS. 1-3.

FIG. 4B demonstrates a diagnostic routine implemented with the computer, verifying the operation of the pump.

FIG. 8 illustrates the computer program routine for diagnosing diaphragm failures.

DESCRIPTION OF THE PREFERRED EMBODIMENTS

Figure 3:
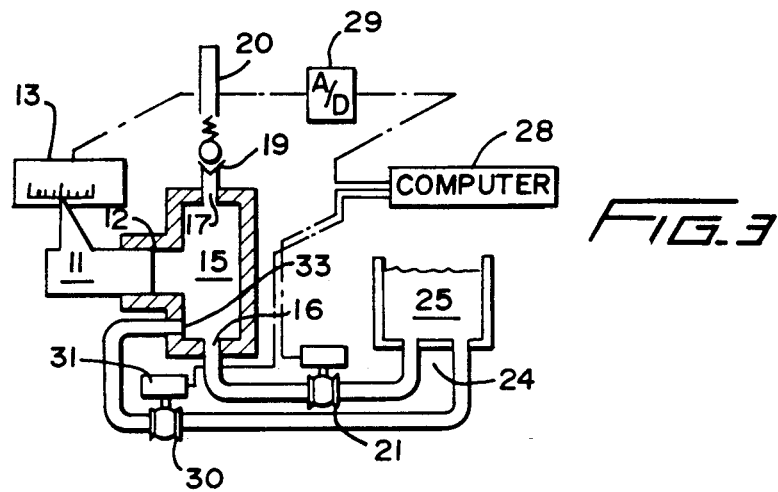
FIG. 3 is a third embodiment of a computerized metering pump having a provision to recirculate vented pumping fluid.

Referring now to FIG. 1A, there is shown a metering pump 9 which is controlled by a computer 28 to provide a precise measured quantity of pumped fluid for each stroke of a piston 11. The pump 9 includes a pumping chamber 15, as well as a piston chamber 12. A reciprocating piston 11 is shown connected to a slider/crank mechanism and motor 10 to reciprocate on a periodic basis as a rate 1/T. The piston 11 will move forward and backward in the piston chamber 12, drawing pumped media from reservoir 25 through valve 21 into the inlet 16. During the forward discharge portion of the piston stroke, the material will be forced through outlet 17, spring loaded check valve 19 and then to outlet pipe 20.

The amount of fluid displaced by the piston 11 can be defined as follows:

$$\frac{\pi d^2}{4} \times L$$

This volume displacement is, of course, proportional to the area of the piston 11, expressed in terms of its diameter as $\frac{1}{4}\pi d^2$ times the stroke length L of the piston. The flow rate for the pump 9 is determined by dividing this volumetric displacement by the stroke period, T, where 1/T=f, the frequency of piston reciprocation.

From the foregoing, it is clear that the volume displaced is a function of the stroke length of the piston 11. By providing a means to effectively shorten this stroke length L, it is possible to establish a fractional amount of the maximum pumping capacity in any given stroke cycle.

The embodiment shown in FIGS. 1A and 1B vary the effective stroke length L of the piston 11 from a maximum $L_{max}$, representing the full piston amplitude hydraulically such as to provide a fractional volumetric output, or a fractional flow rate, as desired. This fractional flow rate is achieved by controlling the inlet valve 21 which supplies pumped media from a reservoir 25 via conduit 24. The piston position is monitored by a sensor 13 connected through the A/D converter 29 to computer 28. The computer 28 makes an accurate calculation of the flow rate for the pump based on the piston displacement L, the stroke period T which is the reciprocal of the stroke frequency f, and the piston diameter d which is constant for a given pump.

$$\dot{Q} = \frac{\pi d^2 L}{4T}$$

Control over the effective stroke length L is accomplished in the embodiments of FIGS. 1A and 1B by opening previously closed valve 21 as soon as the piston 11 has moved the required stroke length L. The computer 28 receives a desired flow rate $\dot{Q}$ as an input from an operator, and from the foregoing equation, calculates for the desired flow rate $\dot{Q}$ a stroke length L.

$$\dot{L} = \frac{4\dot{Q}T}{\pi d^2}$$

The operation of the embodiments of FIGS. 1A and 1B is illustrated in FIG. 2. The diagram of FIG. 2 begins at the portion of the stroke cycle wherein piston 11 is fully retracted. The piston begins to advance, discharging pumping media from the pumping chamber 15 through valve 19. Once the piston 11 has travelled the required distance L as indicated by sensor 13, valve 21 is opened by control 22, permitting any remaining pumping media in pumping chamber 15 to be vented through valve 21, back to reservoir 25. Once the piston 11 has advanced its full stroke length, $L_{max}$ it will begin to retract, drawing pumping fluid from the reservoir 25 into the chamber 15.

Thus, the effective volume displacement from the pump 9 is controlled by detecting when the piston 11 has travelled the required length L to discharge the desired quantity $\dot{Q}$ of pumping media. It is clear that as the effective stroke length L is increased for an increased flow rate, valve 22 will be closed for a greater duration of the total stroke cycle, until the discharge portion of the stroke cycle equals the intake portion of the stroke cycle.

As can be seen comparing FIGS. 1A and 1B, the principles involved in controlling the effective stroke length L, and hence the pumped flow rate, are the same. The presence of the diaphragm 14 in a diaphragm metering pump separates the pumping chamber 15 from a hydraulic chamber 18 having an intermediate fluid.

FIG. 3 illustrates an improvement over the embodiment of FIG. 1A, wherein a separate path for venting pumped media into reservoir 25 is provided. This path is shown as outlet 33 connected to a valve 30 which is connected to reservoir 25. Valves 30 and 21 are operated so that pumping media is supplied through valve 21 and inlet 16 to the pumping chamber 15. When the computer 28 has determined that the piston 11 has travelled the appropriate length L to discharge the required quantity of pumped media, valve 30 will be opened and valve 21 will remain closed. During the intake portion of the piston stroke, wherein pumping media fills chamber 15, valve 21 is open and valve 30 is closed.

The embodiment of FIG. 3 will provide for recirculation of pumped media which will assist when the pumping media has large quantities of solids in suspension as there is only one directional flow in each pipe. This will promote positive media recirculation.

Figure 5:
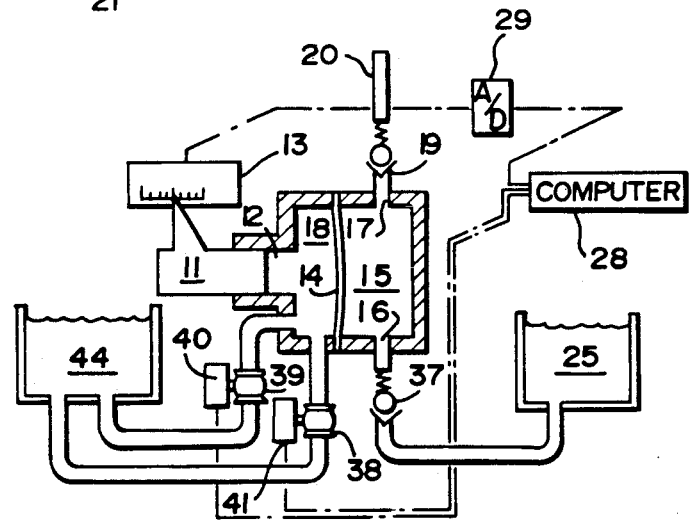
FIG. 5 illustrates control over the metering pump in accordance with a fourth embodiment of the invention wherein pumping pressure is controlled to accurately meter the quantity of pumped fluid.

FIG. 5 shows another embodiment of the invention which provides for venting the intermediate chamber 18 in a diaphragm pump arrangement. When the piston 11 has moved the appropriate distance, as determined by the signal produced by sensor 13, indicating that the required quantity of pumping media has been forced from the pumping chamber 15, valve 38 may be opened to vent the intermediate chamber 18 back to the intermediate reservoir 44. In this way, once the venting begins, diaphragm 14 will not advance any further as the hydraulic pressure imparted by the piston is relieved through the valve 38 into the intermediate reservoir 44. Once the piston 11 has extended its full stroke length, the valve 38 may be closed and valve 39 opened to permit piston 11 to draw intermediate media through valve 39 into the intermediate chamber 18 during its intake cycle in which it is being retracted, thus expanding the volume in intermediate chamber 18.

With the embodiment of FIG. 5, it is possible to reduce the effective stroke length for the piston 11 by appropriately venting the intermediate chamber 18. The inlet 16 is connected through a check valve 37 to a pumping media supply reservoir 25.

Figure 6:
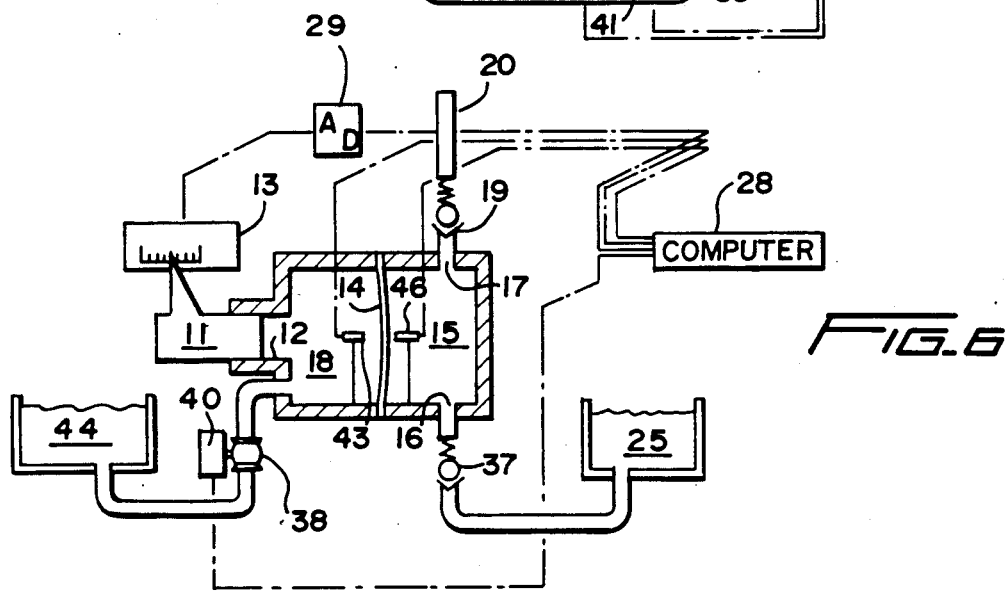
FIG. 6 schematically illustrates additional control over a diaphragm metering pump wherein the starting position for the diaphragm is accurately monitored.

Another embodiment is shown in FIG. 6 in which a diaphragm metering pump is employed to control the precise discharge of pumped media. The diaphragm 14 is shown positioned between two sensor elements 43 and 46. The sensor elements 43 and 46 are connected to computer 28. Computer 28 thus monitors the position of the diaphragm 14 between a maximum displacement adjacent transducer 46 to a minimum displacement adjacent transducer 43. Control over pump stroke is implemented using the valve 38 and valve control 40, operated by the computer 28. When the piston 11 has reached a value indicating the required quantity of pumped media has been discharged through outlet 17, valve 38 will be opened in order to vent the intermediate chamber 18 to the intermediate media reservoir 44. Thus, the remaining piston displaced intermediate media will be transferred to the reservoir.

Sensing of the diaphragm 14 position is useful to accurately position the diaphragm 14 prior to beginning of a discharge cycle of the piston 11. Thus, by closing valve 38 while the piston withdraws, the diaphragm 14 will retract. In this manner, diaphragm 14 can be reliably returned to a beginning position. The proximity sensors 43 and 46 will also detect when the diaphragm is being over or under inflated, a dangerous condition in which diaphragm rupture may be imminent.

The foregoing principles which make use of measuring stroke length of a reciprocating piston, and then hydraulically controlling the effective stroke length L may also be implemented by sensing diaphragm position. It is possible, using a diaphragm position sensor, to measure the diaphragm deflection, and use this measurement to determine when a desired quantity of media has been pumped. If the volume of the deflected shape of the diaphragm can be mathematically approximated, the computer can calculate the displaced volume accordingly. Hydraulic control over a venting valve may be effected using this measured deflection, venting the pumping chamber back to the reservoir, thereby controlling the pumped volume and volume rate.

FIG. 4A shows a particular instruction sequence for controlling the metering pump of FIGS. 1A, 1B and 3 to deliver the determined flow rate. At the beginning of the program, the desired volumetric flow rate Q is read into the computer 28 in step 102. The desired flow rate is based on a stroke cycle time and volumetric discharge which occurs within the stroke cycle time. Assuming that the stroke cycle time is known and constant, using the earlier formula, the required effective stroke length L may be calculated in step 103. The calculation of the stroke length also depends upon having input certain information about the metering pump, such as piston diameter d, piston cycle rate T per the aforesaid equation.

Having thus calculated the desired stroke length for the piston, the intake valve is opened in step 104. This intake valve permits the pumped media to enter the pumping chamber 15 of the embodiments of FIGS. 1A and 1B. The piston reciprocation begins in step 105 by energizing the motor drive to the piston.

The piston position is continually read and recorded in step 107 by monitoring the output of sensor 13. A diagnostics routine 108 is shown which is an optional subroutine to effectively diagnose any failure which might be indicated by the position sensor. This diagnostic routine 108 will be more specifically described with respect to FIG. 4B.

In decision block 109, the piston position is determined to be fully retracted at which point the beginning of the pumping of media from the pumping chamber 15 begins. The intake valve 21 is closed in step 110 to prohibit venting of the pumped media from pumping chamber 15 to the pumping media reservoir 25. The piston position during the subsequent advance of the piston is continuously monitored and recorded in step 111. A further diagnostic routine is shown in 112 which is optional, but described more particularly in FIG. 4B. The diagnostic routine will assist in determining any failure which may occur such that position measurements in step 111 are not within a predicted range.

Once the piston reaches the calculated stroke length L, decision block 113 will indicate it is time to end effective pumping from the chamber 15. In the event a single intake valve such as shown in FIGS. 1A and 1B is employed, as determined by block 114, the inlet valve 21 is opened in step 118, thus effectively ending the pumping stroke for the piston 11. The remaining piston volume is displaced to the media reservoir 25.

In step 119, the desired flow rate is again read into the computer, and a new stroke length is calculated in step 120, identical to the calculation of step 103. In this way, in the event the operator at any point changes the desired flow rate Q, a new stroke length may be correspondingly calculated.

The flow chart of FIG. 4A may also be applied to the system shown in FIG. 3. As will be recalled, this system employs separate valves 21 and 30 to accomplish the intake and vent functions. When two such valves are used, step 121 will follow decision block 114. In block 121, the auxiliary valve 30 is opened in order to vent the pumping chamber back to the reservoir 25. The position of the piston is continuously monitored in step 122 and another diagnostic routine 123 is entered in the event the position of the piston is determined not to be in accordance with a predicted position.

Once the piston reaches its maximum stroke length L, determined by block 124, the intake valve 21 is opened again in step 126 as the piston is fully advanced. At the same time, in step 127 the auxiliary valve 30 is closed, permitting additional pumped media to enter the pumping chamber 15 while the piston 11 retracts to its initial position.

A similar flow chart can be developed for the embodiment of FIG. 5. As will be recalled, the embodiment of FIG. 5 includes an inlet valve 38 and a vent valve 39. Control over these valves by the computer is accomplished with similar instruction sets which will be obvious in light of the previous flow chart (FIG. 4A).

The flow chart outlined in FIG. 4A could utilize diaphragm displacement to determine and/or verify volumetric discharge. As stated previously, the volume of the deflected shape of the diaphragm can be mathematically approximated. Therefore, given a desired volumetric displacement, a value for diaphragm deflection can be calculated. This is analogous to the calculation of L effective for the piston. The diaphragm position can then be monitored during pump discharge—in a manner similar to the way the piston is monitored—until it reaches the proper level of deflection. At this point, the appropriate volume of media will have been discharged.

Referring now to FIG. 4B, the diagnostic routine which is entered at various stages of the programming shown in FIG. 4A. The routine begins with block 201. The first check made is whether or not the piston has changed position as evidenced by the output from the sensor 13. If the piston has changed position, the piston flag is set FALSE in step 202 and the drive flag is also set FALSE in step 203. The two false designations for the drive and piston flags indicate that these components are both operating properly. The current piston position is recorded in step 205 to be used in the next re-entrance to the diagnostics routine. The diagnostic program then exits to the main program in FIG. 4A.

In the event there is no indication of a change in piston position, step 207 will be used to determine whether or not the motor is active. It is contemplated that a motor enable line will be provided by the computer 28. If this enable line is not active, step 208 will determine whether or not the drive flag has been set true. If not, the drive flag will be set true in step 209, and an attempt made to start the motor in step 210. The ENABLE signal will be raised by the computer to try to restart the motor drive.

If the drive flag is set true, and the motor is determined not to be active in step 207, the operator is notified of a failed motor drive in step 222.

Continuing in the diagnostic program, the position sensor output is checked in decision block 212. The normal voltage potential is a non-zero value. If the output is equal to 0, the piston flag is checked to see whether it is true or false. In the event it is not true, the piston flag is set true before exiting via step 205 to the main program. In the event the piston flag has been set true, the operator is notified in step 220 of a failed piston position sensor.

If the piston sensor output is not equal to 0 in block 212, and the drive flag has previously been set true in block 213, the operator is notified in block 221 of a failed drive mechanism. If the drive flag has been set false in block 213, the flag is set true in 214 before exiting via step 205.

If the piston flag has been set true in block 216, or the drive flag has been set true in 208 or 213, a failure condition has been determined and the pump is shut down in step 223. The operator is notified in steps 220–222 of the particular sensed failure.

Thus, the foregoing diagnostics will be used to determine whether there has been any piston motion. In the event there has not been, the fault condition is analyzed to determine whether a piston position sensor failure has occurred, there is a drive mechanism failure, or a motor failure.

Figure 7A:
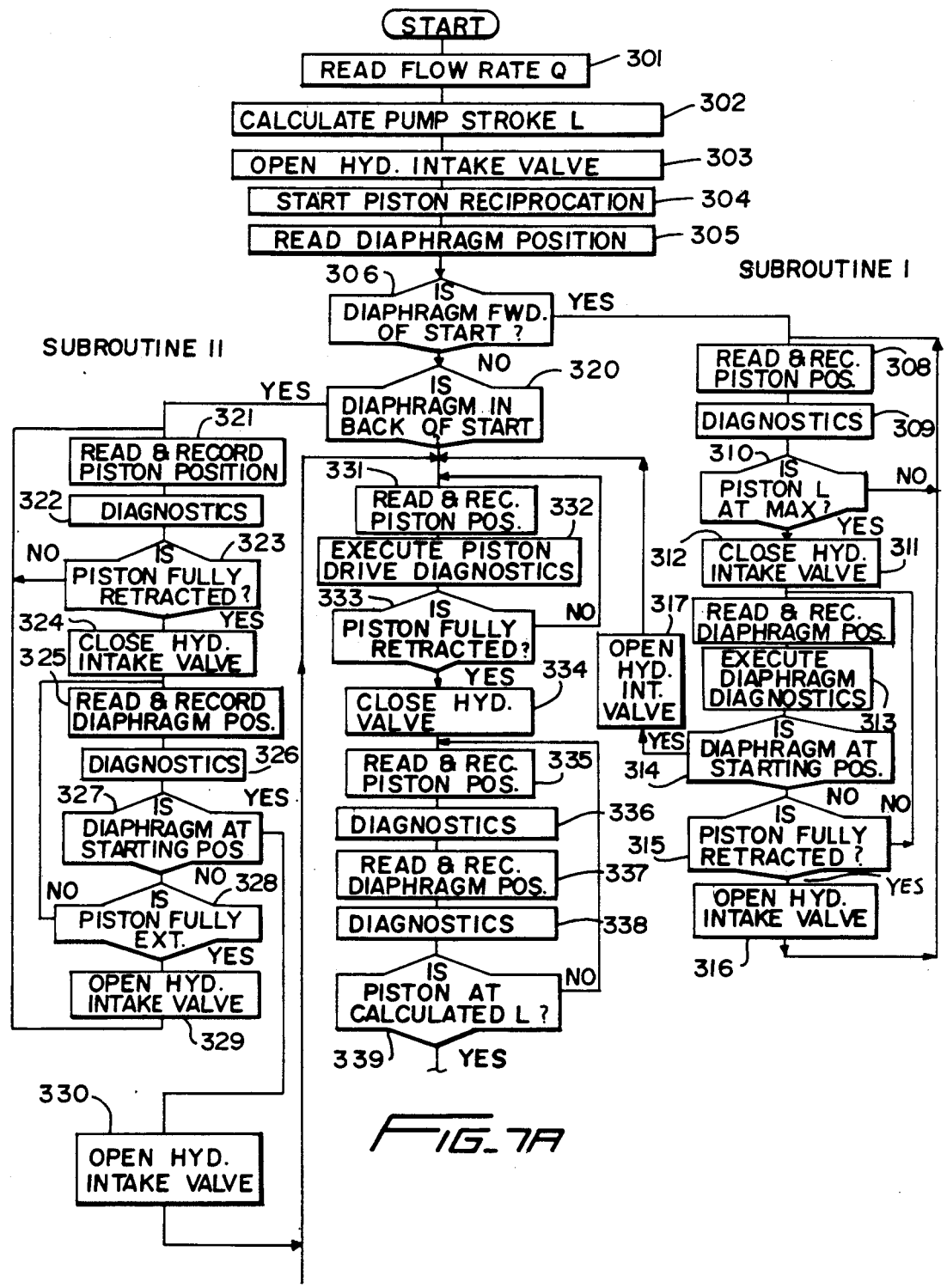
FIGS. 7A and 7B illustrate the programming routine for the embodiment of FIG. 6 wherein a metering pump includes a hydraulically balanced diaphragm.
Figure 7B:
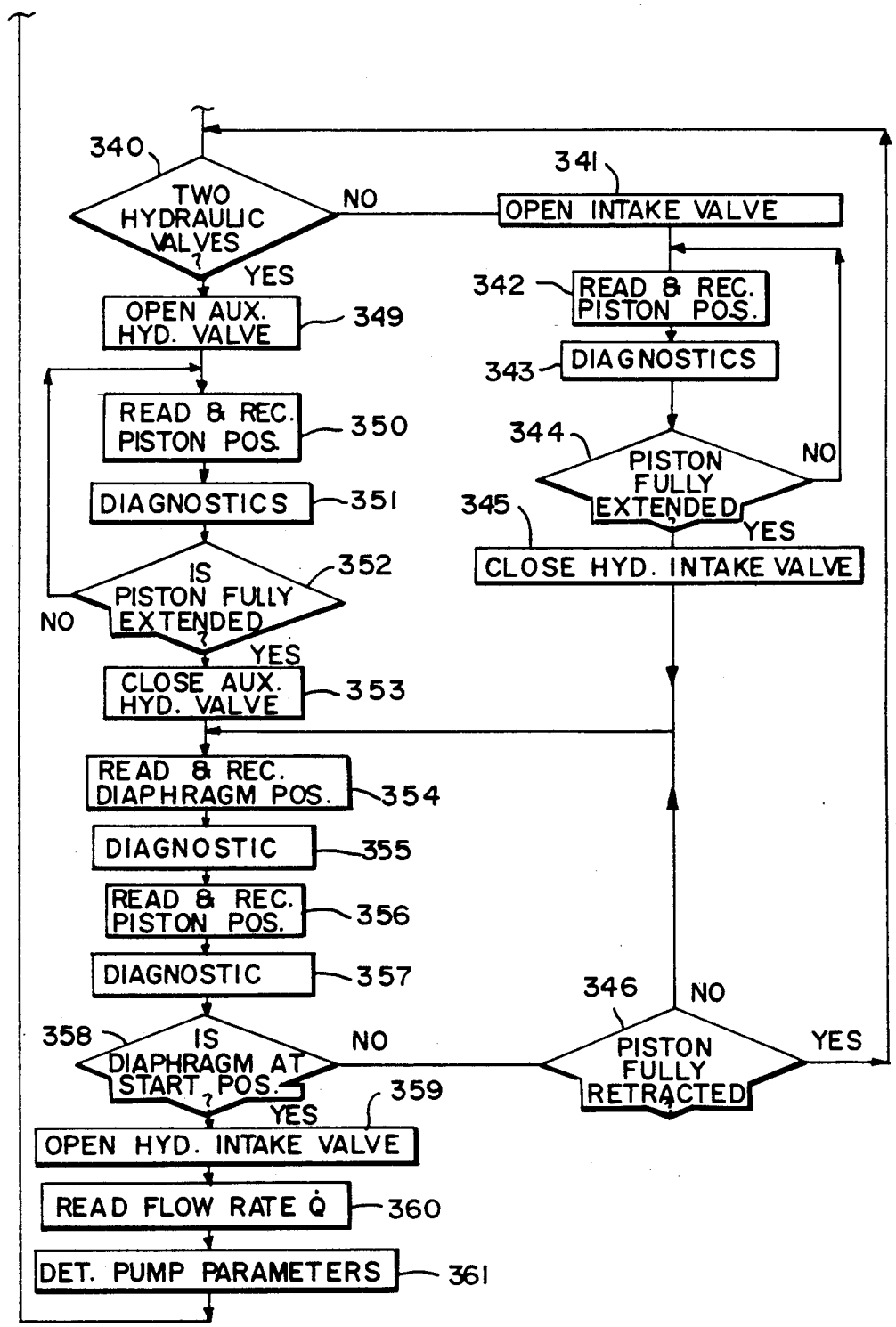

Referring now to FIGS. 7A and 7B, there is shown a program routine for controlling the metering pump of FIG. 6. The flow chart shown in FIGS. 7A and 7B describe the programming steps executed by computer 28 for controlling the hydraulically balanced diaphragm metering pump.

There are shown programming steps for the computer 28 in the embodiments shown in FIG. 6. This embodiment is a hydraulically balanced diaphragm metering pump which accurately positions the diaphragm prior to beginning a pumping discharge stroke. In the embodiment shown in FIG. 6, two proximity sensors are shown, 43 and 46, which detect whether or not the diaphragm is properly positioned to begin a discharge portion of the pump cycle.

The programming steps shown in FIG. 7 include two branches, I and II. Each of these branches is used to position the diaphragm at pump start-up. The branch that is taken depends on whether it has been determined that the diaphragm is forward or rearward of its start position. As is clear from FIG. 7A, two decision blocks 306 and 320 will make the determination as to whether or not the diaphragm is in its correct position. If not, the program will exit to the prepositioning appropriate subroutine shown in I and II.

The beginning of the computer-executed sequence starts with a reading of the desired flow rate $\dot{Q}$ in step 301. From this signal, i.e., inputted data by the operator, a pump stroke L is determined which will generate the appropriate flow rate in accordance with the previous equations. The hydraulic intake valve is opened in step 303, corresponding to the valve 38 shown in FIG. 6. At this time, the piston reciprocation is started in step 304, while simultaneously reading the diaphragm position in step 305. The diaphragm position is determined from signals produced by proximity sensors 43 and 46.

If the diaphragm has been determined to be in the proper starting position, decision blocks 306 and 320 will transfer control to programming step 331. At this time, the piston position is read from the position sensor 13. Piston drive diagnostics are included in step 332 which were described previously with regard to FIG. 4B. It should be noted that this is optional and the program can be configured to operate without the diagnostics subroutine of 332.

Decision block 333 will determine whether or not the piston has been fully retracted. When the piston is in its fully retracted position, as noted from the position sensor 13, valve 38 is closed to begin the start of the discharge portion of the stroke cycle step 334. The positions of the piston and diaphragm are continually read and diagnosed in steps 335–338, and when the piston reaches the calculated distance L for discharging the appropriate amount of pumped media as determined by decision block 339 within the required time interval, decision block 340 will transfer control to steps 341 or 349, depending on whether two or a single valve is provided in the intermediate fluid circuit.

Assuming that only a single valve is included in the intermediate reservoir supply, step 341 will open the intake valve, thus venting the intermediate pressure chamber 18 into the reservoir 44. The piston position is continually read in step 342, and when the piston has been fully extended, decision block 344 will transfer control to step 345 which closes the hydraulic intake valve 38.

When two valves are employed in venting and supplying fluid to the intermediate chamber, such as is shown in FIG. 5, it being appreciated that the embodiment of FIG. 5 could also include two proximity sensors 43 and 46, the decision block 340 will transfer control to step 349. The second valve is opened to permit venting of the intermediate chamber through the second such valve 38 of FIG. 5. The position of the piston is monitored in step 350 and when a fully extended position is obtained, decision block 352 will close the previously opened valve 38 by executing step 353. Diagnostics are included in step 351, similar to step 343, and are totally optional.

Once the required stroke length has been achieved in either a single or two valve configuration, the diaphragm and piston positions are noted in steps 354 and 356, respectively, and when the diaphragm has been returned to its START position as determined in step 358, the intake valve is opened in step 359. The current desired flow rate $\dot{Q}$ is again read in step 360 and the pump parameters calculated in step 361 each time the program passes through a completed stroke.

The subroutine designated by I will position the diaphragm to a starting position when it has been found to be forward of its predetermined starting position. Step 308 and decision block 310 will continuously read the position of the piston and when it has reached its maximum extension, will close the hydraulic intake valve in step 311. Step 312 and decision block 314 will monitor the diaphragm position as it retracts with the piston. Once the position of the diaphragm has been determined to be correct in decision block 314, due to the retraction of the piston which will exert a pressure on the diaphragm, pulling it towards its starting position, control will switch to step 317. In step 317, the hydraulic intake valve will be opened to stop movement of the diaphragm.

Control will proceed with step 331. If the diaphragm is not at its starting position as determined in block 314, block 315 will evaluate the piston position. If the piston is fully retracted, the hydraulic intake valve will be opened in step 316, permitting fluid to enter the intermediate chamber while the piston is extended to its furthest position. The program then recycles to step 308 until the diaphragm is properly positioned.

Subroutine II similarly operates to position the diaphragm to its correct starting position when it is found to be in back of its correct position. This requires continuously reading the position of the piston in step 321 and determining whether or not the piston is fully retracted in step 323. When it has become fully retracted, the intake valve is closed in step 324. Measurements of the diaphragm position are made in step 325. Once the diaphragm is determined to be at its correct starting position, as determined by block 327, the hydraulic intake valve is opened in step 330 and control can switch to step 331. When the piston becomes fully extended, and the diaphragm has not reached starting position, as determined by block 328, the intake valve is opened in step 329 and the process recycles to 321 until the diaphragm has been correctly positioned.

Thus, there is shown one programming scheme which will permit the implementation of the embodiment shown in FIG. 6, using a single valve, as well as a double valve configuration shown in FIG. 5, when accompanied by a proximity sensor for positioning the diaphragm. The computer control over the start position for the diaphragm will make the accurate discharge of a predetermined quantity of pumped fluid more consistent over time. Additionally, the various diagnostic routines will aid in determining when the diaphragm pump has suffered a failure, and permits warning of the operator that the failure has occurred.

The diagnostic routines are piston drive diagnostic routines and diaphragm diagnostic routines. The piston drive diagnostic routine is shown in FIG. 4B and is incorporated throughout the execution of the program of FIGS. 7A and 7B.

The diaphragm diagnostic routine of FIG. 8 begins by detecting whether or not the diaphragm has changed position in step 401. If it has, there is a diaphragm flag which is set FALSE in step 403. The routine then exits through step 411.

When the diaphragm has not been determined to have changed position, the sensor output signal from sensors 43 and 46 is checked in step 404. In the event the sensor output is determined not to be 0, and the drive flag has not been set true as determined in step 405, the operator is warned of a diaphragm malfunction in step 406. Should the drive flag be set true in 405, the routine exits through block 411. The drive flag is set during the piston diagnostic routine, as previously explained regarding FIG. 4B.

In the event decision block 404 indicates that the output from sensors 43 and 46 is 0, and the diaphragm flag has been set to true in step 408, failure in the diaphragm position sensor is noted in step 412. This could be a failure of the sensor or the diaphragm itself. The pump is shut down in step 413 upon notification of the operator in step 412 of the failed component. Should the diaphragm flag be set false in block 408, it is subsequently set true in block 409. The routine then exits through 411.

Assuming the diaphragm diagnostics indicate no problem, the old diaphragm position value is set in step 411 to the new value and the program continues as though no failure had occurred. The routine subsequently exits to the calling program.

The foregoing computer implementations are exemplary only of schemes which may be implemented to include diagnostic routines or to admit diagnostic routines. These embodiments will provide for distributed localized control over metering pumps which may be updated by an operator as convenient, and which will warn of malfunctions as they occur.

What is claimed is:

1. A computer controlled pumping system comprising:

a metering pump having a pumping piston which moves a predetermined stroke distance, forcing a predetermined quantity of pumped fluid from an inlet to an outlet;

a first electrically operated solenoid valve connected between said inlet and a supply reservoir;

a displacement sensor connected to monitor the position of said pumping piston within said stroke distance; and, a computer connected through an interface to said displacement sensor and said electrically operated solenoid valve, said computer receiving an operator-supplied value of volume flow for said metering pump, and calculating a volume displacement of media from a signal from said sensor, said computer comparing said calculated volume flow rate with said operator-supplied volume flow rate, and operating said solenoid valve when said volumes are equal, whereby a flow of fluids from said metering pump equals said operator-supplied volume of flow.

2. The computer controlled system of claim 1 comprising a second electrically operated solenoid valve connecting a recirculation port of said pump to said reservoir, and operated by said computer.

3. A computer controlled pump comprising:

a diaphragm pump having a pumping piston displacing an intermediate fluid in an intermediate chamber against a movable diaphragm in fluid communication with a pumping chamber;

a media reservoir connected to said pumping chamber;

a media outlet connected to said pumping chamber;

a displacement sensor connected to measure said pumping piston displacement;

an intermediate media reservoir connected by electrically controlled valve means to said intermediate chamber for supplying said intermediate fluid to said intermediate chamber, and venting said intermediate chamber to said intermediate media reservoir; and, a computer connected to receive a signal from said displacement sensor, said computer determining from said sensor signal a related volumetric displacement of said pumping media, and comparing said related volumetric displacement with a desired volumetric displacement, and for supplying an actuation signal to said electrically controllable valve means for terminating pumping by said diaphragm pump when said related volumetric displacement equals said desired volumetric displacement.

4. A computer controlled pump according to claim 3 comprising a second electrically connected valve means connecting said intermediate media reservoir to said intermediate chamber for recirculating fluid through said intermediate chamber.

5. The computer controlled pump according to claim 3 further comprising a position sensor for detecting the relative position of said diaphragm.

6. The computer controlled pump according to claim 5 wherein said diaphragm position sensor is connected to said computer, and said computer monitors said diaphragm position.

7. The computer controlled pump according to claim 6 wherein said computer determines a starting position for said diaphragm from a signal from said diaphragm position sensor.

8. The computer controlled pump of claim 7 wherein said computer is programmed to return said diaphragm to a starting position before commencing pumping of said pumping media by controlling said valve means.

9. The computer controlled pump of claim 7 further including a diagnostic programming routine for detecting when a failure has occurred in said computer controlled pump.

10. A computer controlled metering pump comprising:
 (a) a metering pump having a reciprocating piston which pumps a quantity of pumping media based upon a stroke length of the piston;
 (b) a stroke position sensor connected to measure a stroke length of said piston;
 (c) means connected to said metering pump for inhibiting pumping of pumped media, by changing the effective piston stroke length; and,
 (d) a computer connected to said stroke position sensor and said means for inhibiting pumping for controlling the effective volume of pumped media, said computer determining from said position sensor a volume of pumping media being pumped, and comparing said computed volume of media with a desired volume of media, said computer connected to provide a signal to said means for inhibiting when said pumped media volume equals said desired volume inhibiting further pumping of said pumping media.

11. A computer controlled metering pump of claim 10 wherein said means for controlling inhibition of pumped media is an electrically operated solenoid valve means connected between a pumped media reservoir and said metering pump for venting said pump when said pumped media volume equals said desired media volume.

12. The computer controlled metering pump of claim 10 wherein said means for inhibiting pumping comprises:
 an intermediate pressurizing means for transferring a hydraulic force from said piston to a pumping chamber of said metering pump; and,
 electrically operated valve means connected to said intermediate pressurizing means for controlling the effective hydraulic force.

13. The computer controlled metering pump of claim 11 wherein said valve means is connected to a reservoir of intermediate hydraulic media.

14. A computer controlled pump comprising:
 a diaphragm pump having a pumping piston displacing an intermediate fluid in an intermediate chamber against a movable diaphragm in fluid communication with a pumping chamber;
 a media reservoir connected to said pumping chamber;
 a media outlet connected to said pumping chamber;
 a diaphragm position sensor means connected to measure said diaphragm displacement;
 an intermediate media reservoir connected by electrically controlled valve means to said intermediate chamber for supplying said intermediate fluid to said intermediate chamber, and venting said intermediate chamber to said intermediate media reservoir; and
 a computer connected to receive a signal from said diaphragm sensor, said computer determining from said sensor signal a related volumetric displacement of said pumping media, and comparing said related volumetric displacement with a desired displacement, and for supplying an actuation signal to said electrically controlled valve means for terminating pumping by said diaphragm pump when said related volumetric displacement equals said desired volumetric displacement.

15. A computer controlled pump according to claim 14 comprising a second electrically connected valve means connecting said intermediate media reservoir to said intermediate chamber for recirculating fluid through said intermediate chamber.

16. The computer controlled pump according to claim 14 further comprising a position sensor for detecting the position of said pumping piston.

* * * * *